United States Patent
O'Rear et al.

(10) Patent No.: US 6,720,359 B2
(45) Date of Patent: *Apr. 13, 2004

(54) SCRUBBING $CO_2$ FROM A $CO_2$-CONTAINING GAS WITH AN AQUEOUS STREAM

(75) Inventors: Dennis J. O'Rear, Petaluma, CA (US); Curtis Munson, Oakland, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/951,553

(22) Filed: Sep. 14, 2001

(65) Prior Publication Data

US 2003/0055117 A1 Mar. 20, 2003

(51) Int. Cl.[7] .................. C07C 27/00; B01D 47/04; E21B 43/00
(52) U.S. Cl. .................. 518/702; 518/700; 95/150; 166/267
(58) Field of Search .................. 518/700, 702; 95/150; 166/267

(56) References Cited

U.S. PATENT DOCUMENTS

| | | | |
|---|---|---|---|
| 4,093,029 A | | 6/1978 | Weisz et al. |
| 4,322,227 A | * | 3/1982 | Cook et al. .................. 95/150 |
| 5,364,611 A | | 11/1994 | Iijima et al. |
| 5,660,603 A | | 8/1997 | Elliot et al. |
| 6,170,264 B1 | | 1/2001 | Viteri |
| 6,190,301 B1 | | 2/2001 | Murray |
| 6,248,794 B1 | * | 6/2001 | Gieskes .................. 518/700 |

FOREIGN PATENT DOCUMENTS

| | | |
|---|---|---|
| DE | 31 09 120 A | 9/1982 |
| EP | 0 921 184 | 9/1999 |
| GB | 311299 | 4/1929 |
| GB | 1 330 604 B | 9/1973 |
| GB | 2123027 | 1/1984 |
| WO | 95/20558 | 8/1995 |

OTHER PUBLICATIONS

Arthur Kohn et al., "Gas Purification," Gulf Publishing Company, 1997, pp. 417–465.
John H. Perry, Chemical Engineering Handbook, 4th Edition, pp. 9–51, McGraw Hill Book Company, 1963.
E. Dendy Sloan, Jr., "Clathrate Hydrates of Natural Gases," Marcel Dekker, Inc., 1990.
John Nighswander et al., "Solubilities of Carbon Dioxide in Water and 1 wt% NaCl Solution at Pressures upto 10 Mpa and Temperatures from 80 to 200 Degrees C," J. Chem. Eng. Data, 1989, 34, 355–360.
International Search Report dated Dec. 23, 2002.
United Kingdom Search and Examination Report dated Mar. 12, 2003.
Netherlands Report dated May 7, 2003.

* cited by examiner

*Primary Examiner*—J. Parsa
(74) *Attorney, Agent, or Firm*—Burns, Doane, Swecker & Mathis, L.L.P.

(57) ABSTRACT

A process for removing $CO_2$ from a $CO_2$-containing gas. The process includes scrubbing $CO_2$ from a $CO_2$-containing gas using an aqueous phase liquid forming a $CO_2$-enriched aqueous phase. The $CO_2$-enriched aqueous phase is then disposed of in at least one of a marine environment, a terrestrial formation or combination thereof.

20 Claims, 2 Drawing Sheets

SCRUBBING $CO_2$ FROM A $CO_2$-CONTAINING GAS WITH AN AQUEOUS STREAM

BACKGROUND OF THE INVENTION

1. Field of the Invention

The present invention is directed to removing $CO_2$ from $CO_2$-containing gases. In particular, the present invention is directed to scrubbing $CO_2$ from a Fischer-Tropsch GTL process gas or furnace exhaust gas using an aqueous stream, preferably at an elevated pressure, and disposing of the removed $CO_2$ in a manner that isolates the $CO_2$ from the environment.

2. Description of the Related Art

The conversion of remote natural gas assets into transportation fuels has become more desirable because of the need to exploit existing natural gas assets as a way to satisfy the increasing need for transportation fuels. Generally, the term "remote natural gas" refers to a natural gas asset that cannot be economically shipped to a commercial market by pipeline.

Conventionally, two approaches exist for converting remote natural gases into conventional transportation fuels and lubricants including, but not limited to, gasoline, diesel fuel, jet fuel, lube base stocks, and the like. The first approach comprises converting natural gas into synthesis gas by partial oxidation, followed by a Fischer-Tropsch process, and further refining resulting in Fischer-Tropsch products. The second approach comprises converting natural gas into synthesis gas by partial oxidation, followed by methanol synthesis wherein the synthesized methanol is subsequently converted into highly aromatic gasoline by a Methanol-To-Gasoline (MTG) process. Both of these approaches use synthesis gas as an intermediate. Also, while other approaches exist for using natural gas in remote locations, such approaches do not produce conventional transportation fuels and lubricants, but instead produce other petroleum products including, but not limited to, liquified natural gas (LNG) and converted methanol. The Fischer-Tropsch and MTG processes both have advantages and disadvantages. For instance, the Fischer-Tropsch process has the advantage of forming products that are highly paraffinic. Highly paraffinic products are desirable because they exhibit excellent combustion and lubricating properties. Unfortunately, a disadvantage of the Fischer-Tropsch process is that the Fischer-Tropsch process emits relatively large amounts of $CO_2$ during the conversion of natural gas assets into saleable products. An advantage of the MTG process is that the MTG process produces highly aromatic gasoline and LPG fractions (e.g., propane and butane). However, while highly aromatic gasoline produced by the MTG process is generally suitable for use in conventional gasoline engines, highly aromatic MTG gasoline may be prone to form durene and other polymethyl aromatics having low crystallization temperatures that form solids upon standing. In addition, the MTG process is more expensive than the Fischer-Tropsch process and the products produced by the MTG process cannot be used for lubricants, diesel engine fuels or jet turbine fuels. Furthermore, like the Fischer-Tropsch process, the MTG process also generates $CO_2$.

Catalysts and conditions for performing Fischer-Tropsch reactions are well known to those of skill in the art, and are described, for example, in EP 0 921 184A1, the contents of which are hereby incorporated by reference in their entirety. A schematic of a conventional Fischer-Tropsch process is shown in FIG. 1.

The Fischer-Tropsch process can be understood by examining the stoichiometry of the reaction that occurs during a Fischer-Tropsch process. For example, during Fischer-Tropsch processing, synthesis gas (i.e., a mixture including carbon monoxide and hydrogen), is generated, typically from at least one of three basic reactions. Typical Fischer-Tropsch reaction products include paraffins and olefins, generally represented by the formula $nCH_2$. While this formula accurately defines mono-olefin products, it only approximately defines $C_5^+$ paraffin products. The value of n (i.e., the average carbon number of the product) is determined by reaction conditions including, but not limited to, temperature, pressure, space rate, catalyst type and synthesis gas composition. The desired net synthesis gas stoichiometry for a Fischer-Tropsch reaction is independent of the average carbon number (n) of the product and is about 2.0, as determined by the following reaction equation:

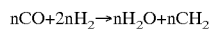
$$nCO+2nH_2 \rightarrow nH_2O+nCH_2$$

where $nCH_2$ represents typical Fischer-Tropsch reaction products such as, for example, olefins and paraffins. The amount of by-product water produced by the reaction is significant. For instance, when converting the molar ratios to weight ratios, one can see what the relative weight percentages of water to $CH_2$ hydrocarbons is 56%/44%.

The three general reactions that produce synthesis gas from methane are as follows:

1. steam reforming of methane: $CH_4+H_2O \rightarrow CO+3H_2$;
2. dry reforming, or reaction between $CO_2$ and methane: $CH_4+CO_2 \rightarrow 2CO+2H_2$; and
3. partial oxidation using oxygen: $CH_4+\frac{1}{2}O_2 \rightarrow CO+2H_2$.

Although the above general reactions are the basic reactions used to produce synthesis gas, the ratio of hydrogen to carbon monoxide produced by the above reactions is not always adequate for the desired Fischer-Tropsch conversion ratio of 2.0. For example, in the steam reforming reaction, the resulting ratio of hydrogen to carbon monoxide is 3.0, which is higher than the desired hydrogen to carbon ratio of 2.0 for a Fischer-Tropsch conversion. Similarly, in the dry reforming reaction, the resulting hydrogen to carbon monoxide ratio is 1.0, which is lower than the desired hydrogen to carbon monoxide ratio of 2. In addition to exhibiting a hydrogen to carbon monoxide ratio that is lower than the desired ratio for a Fischer-Tropsch conversion, the above dry reforming reaction also suffers from problems associated with rapid carbon deposition. Finally, because the above partial oxidation reaction provides a hydrogen to carbon monoxide ratio of 2.0, the partial oxidation reaction is the preferred reaction for Fischer-Tropsch conversions.

In commercial practice, an amount of steam added to a partial oxidation reformer can control carbon formation. Likewise, certain amounts of $CO_2$ can be tolerated in the feed. Thus, even though partial oxidation is the preferred reaction for Fischer-Tropsch conversions, all of the above reactions can occur, to some extent, in an oxidation reformer.

During partial oxidation, $CO_2$ forms because the reaction is not perfectly selective. That is, some amount of methane in the reaction will react with oxygen to form $CO_2$ by complete combustion. The reaction of methane with oxygen to form $CO_2$ is generally represented by the following reactions:

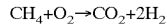
$$CH_4+O_2 \rightarrow CO_2+2H_2$$

and

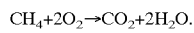
$$CH_4+2O_2 \rightarrow CO_2+2H_2O.$$

Furthermore, steam added to the reformer to control coking, or steam produced during the Fischer-Tropsch reaction can react with CO to form $CO_2$ in a water gas shift reaction represented by the following general reaction:

$$CO + H_2O \rightarrow CO_2 + H_2.$$

In addition, light by-product gases, including $C_1$–$C_4$ hydrocarbons, are frequently used as fuel in furnaces. These fuels often include $CO_2$ from a GTL facility along with some unreacted CO. Moreover, during operation, a furnace provides heat that can contribute to the generation of substantial amounts of $CO_2$.

Thus, invariably a significant amount of $CO_2$ is formed during the conversion of methane into transportation fuels and lubricants by the Fischer-Tropsch process. The $CO_2$ produced during the Fischer-Tropsch process exits the Fischer-Tropsch/GTL process in a tail gas exiting the Fischer-Tropsch unit. Tail gases exiting a Fischer-Tropsch/GTL process comprise any gases that remain unconsumed by the Fischer-Tropsch process.

The overall proportion of carbon in methane that is converted to heavier hydrocarbon products has been estimated to be as high as about 68%. Thus, the remaining 32% can form significant amounts of $CO_2$. These estimates of carbon efficiency are provided, for example, by Bechtel Corporation for a GTL complex using cryogenic air separation, an autothermal reformer, a slurry bed Fischer Tropsch unit and a hydrocracker for conversion of heavy wax into saleable products. See "$CO_2$ Abatement in GTL Plant: Fischer-Tropsch Synthesis," Report #PH3/15, November 2000, published by IEA Greenhouse Gas R&D Programme, the contents of which are hereby incorporated by reference in their entirety. Additionally, although the above estimates are provided for a specific GTL complex, it is believed that similar carbon efficiencies and $CO_2$ emissions would be produced by GTL processes employing alternative technologies.

The above equations represent general stoichiometric equations, they do not reflect an optimum synthesis gas composition for the kinetics or selectivity of a Fischer-Tropsch reaction. Moreover, depending on the nature of the Fischer-Tropsch catalyst, synthesis gas ratios other than 2.0, typically less than 2.0, are used to prepare the feed to a Fischer-Tropsch unit. However, because Fischer-Tropsch units typically produce products exhibiting a hydrogen to carbon ratio of about 2.0, the limiting reagent, typically $H_2$, is consumed first. The extra reagent, typically CO, is then recycled back to the Fischer-Tropsch unit for further conversion. Synthesis gas compositions having hydrogen to carbon ratios other than 2.0 are typically generated by recycling unused reagents.

As a result, there is an urgent need for processes that can remove $CO_2$ from $CO_2$-containing streams, including Fischer-Tropsch GTL process streams and furnace exhaust gases, and can dispose of the removed $CO_2$ while effectively isolating it from the environment.

SUMMARY OF THE INVENTION

The present invention satisfies the above objectives by providing a process that removes $CO_2$ from a $CO_2$-containing gas by scrubbing the $CO_2$ with an aqueous phase liquid, preferably at a pressure greater than about atmospheric pressure, and disposes of a resulting $CO_2$-enriched aqueous stream in a manner that isolates the removed $CO_2$ from the environment.

A process of the present invention for removing $CO_2$ from a $CO_2$-containing gas can include scrubbing $CO_2$ from a $CO_2$-containing gas using an aqueous phase liquid, forming a $CO_2$-enriched aqueous phase. The process can further include disposing of the $CO_2$-enriched aqueous phase in at least one of a marine environment, a terrestrial formation or combination thereof.

Also, a process, according to the present invention, for converting methane-containing gas in a Fischer-Tropsch GTL facility into liquid hydrocarbons can include converting methane-containing gas into synthesis gas. At least a portion of the synthesis gas is converted into liquid hydrocarbons and $CO_2$-containing gas. The process further includes scrubbing $CO_2$ from the $CO_2$-containing gas using an aqueous phase liquid to form a $CO_2$-enriched aqueous phase. Finally, the $CO_2$-enriched aqueous phase is disposed of in at least one of a marine environment, a terrestrial formation or combination thereof.

Thus, in general, the present invention removes $CO_2$ from $CO_2$-containing gases, including Fischer-Tropsch GTL process streams and furnace exhaust gases, using an aqueous phase liquid to scrub the $CO_2$ from the $CO_2$-containing gas. Accordingly, one important advantage of the present invention is that it can reduce the amount of $CO_2$ vented into the atmosphere from a Fischer-Tropsch GTL process or furnace without having to employ expensive $CO_2$ isolation techniques including, but not limited to, gaseous $CO_2$ compression, liquefaction or solidification.

DETAILED DESCRIPTION OF THE PREFERRED EMBODIMENTS

Figure 1:
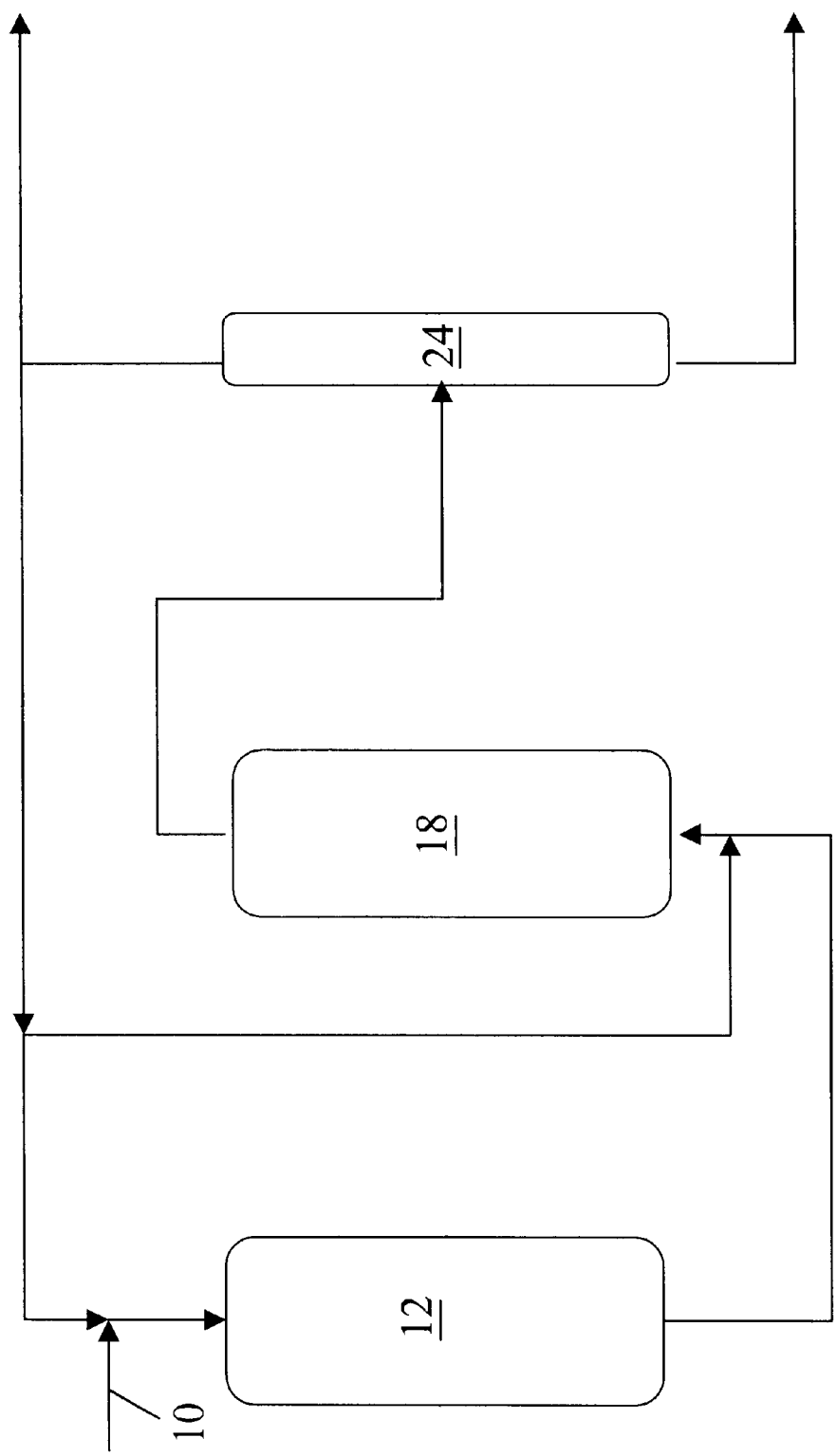
FIG. 1 is a schematic view of a conventional Fischer-Tropsch process.

In the present invention at least a portion of $CO_2$ present in a $CO_2$-containing gas is removed and disposed of in an aqueous phase. In processes of the present invention, $CO_2$ generated, for example, by a Fischer-Tropsch GTL process is isolated from the environment by scrubbing $CO_2$-containing streams with an aqueous stream, preferably at a pressure greater than about atmospheric pressure to assist in the removal of $CO_2$. Although scrubbing, in accordance with the present invention, can be performed in any number of locations in a GTL process, in preferred embodiments, scrubbing is not conducted upon streams that contain significant amounts of liquid hydrocarbons. In particular, scrubbing to remove $CO_2$ from streams that also contain significant amounts of liquid hydrocarbons is avoided because the presence of significant amounts of liquid hydrocarbons can make separation more difficult.

Moreover, because the amount of $CO_2$ that can be dissolved in an aqueous stream can be dependent on pressure, it is preferable to conduct scrubbing at pressures greater than about atmospheric pressure. In addition, because many $CO_2$-containing streams in a GTL process are at pressures greater than atmospheric pressure, scrubbing can be conducted in a number of possible locations.

Once scrubbing has been conducted, the $CO_2$-enriched aqueous stream, still at an elevated pressure, can be disposed of using a suitable environmentally friendly disposal technique. Suitable methods for the disposal of $CO_2$-containing aqueous streams, in accordance with the present invention, include, but are not limited to, injection into a marine environment, injection into a terrestrial formation, combinations thereof and the like. There are numerous marine environments suitable for the disposal of $CO_2$-enriched aqueous streams. For instance, suitable marine environments include, but are not limited to, oceans, seas, lakes, ponds, reservoirs, pools, springs, streams, rivers combinations thereof and the like. There are also numerous suitable terrestrial formations for the disposal of $CO_2$-enriched aqueous streams. Suitable terrestrial formations for the disposal of $CO_2$ include, but are not limited to, underground natural liquid and gaseous formations, coal beds, methane hydrates, combinations thereof and the like.

If the pressure required for injection during disposal is greater than the pressure of the $CO_2$-containing stream exiting the GTL facility, pressure can be easily and inexpensively increased using liquid phase pumps. Ideally, the $CO_2$-containing stream is injected at a pressure, temperature, and pH such that the $CO_2$ will not form a gas, but will remain dissolved in the liquid. For instance, in preferred embodiments, pressure, temperature and pH are sufficient to ensure that at least about 75%, more preferably at least about 85% and most preferably at least about 90% of the $CO_2$ removed from the $CO_2$-containing gas remains dissolved in the aqueous phase. Generally, pressure is adjusted according to the temperature and pH during disposal.

There are several sources of aqueous streams for scrubbing that are suitable for the present invention. Suitable sources of aqueous streams include, but are not limited to, sea water, reaction water formed in a Fischer-Tropsch GTL process, spent cooling water from a Fischer-Tropsch GTL facility, river water or other non-potable water sources, and water recovered from crude or gas production.

The pH of the aqueous stream used in scrubbing may also be important. Preferably, an aqueous stream, in processes of the present invention, exhibits a pH that is as high as possible, preferably greater than about 7.0. A high pH aqueous stream is beneficial because a high pH facilitates scrubbing of $CO_2$. The pH of the aqueous stream used for scrubbing $CO_2$ can be increased using any number of suitable techniques. Suitable techniques for increasing pH of an aqueous stream include, but are not limited to, adding an alkali and/or other basic materials, such as ammonia. However, because these materials must be disposed of, these materials are preferably inexpensive and benign to the environment in which they will be disposed. Accordingly, in view of the need to minimize cost and environmental impact, preferred aqueous sources include, but are not limited to, sea water, river water, or other non-potable water sources from the environment.

GTL process water may be an especially suitable aqueous source because it is abundantly produced during Fischer-Tropsch GTL processing. For instance, when referring to the stoichiometric equation governing the conversion of synthesis gas to Fischer-Tropsch products:

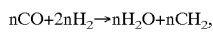

$$nCO+2nH_2 \rightarrow nH_2O+nCH_2,$$

it can be seen that the weight ratio of water to hydrocarbon produced by the reaction is about 1.25. Thus, a typical Fischer-Tropsch GTL process produces about 25% more water than hydrocarbon, on a weight basis. Although GTL process water is abundantly produced, a disadvantage of using GTL process water as an aqueous stream, is that GTL process water may contain acidic contaminants, such as, for example, acetic acid and/or other organic acids. Acidic contaminants present in GTL process water can act to lower the pH of the water, thereby reducing the solubility of $CO_2$ therein. As a result, if GTL process water is used for scrubbing $CO_2$, it is preferable to remove acidic contaminants from the GTL process water before using it as a scrubbing stream. The acidic contaminants in GTL process water can be removed using various known methods. Suitable methods for removing acidic components from GTL process water include, but are not limited to, distillation, adsorption onto alumina or a basic material, oxidation, combinations thereof and the like.

In addition to pH and acidic contaminant composition, it may also important to limit the oxygen content of the aqueous stream. Preferably, an aqueous stream is de-aerated before being used for scrubbing to increase the aqueous stream's capacity to adsorb $CO_2$ and to minimize the amount of air introduced into the gas stream. Suitable processes for de-aeration of aqueous streams are well known in the art and are used, for example, in desalination plants and for preparation of boiler feed water. Such processes are described in detail, for example, in John H. Perry's Chemical Engineering Handbook, $4^{th}$ Edition, pages 9–51, McGraw Hill Book Company, 1963.

If the $CO_2$-enriched aqueous stream generated in the present invention is disposed of in a terrestrial formation, disposal of the aqueous stream may be conducted in the same formation used to supply methane for the GTL process. In addition, it is equally suitable to dispose of $CO_2$-enriched aqueous streams generated by the present invention in a terrestrial formation that differs from the formation used to supply methane to the process. In instances where disposal is conducted in the same formation used to supply methane to the process, disposal can be conducted either at the same location where methane production is conducted or at a different location. Preferably, if disposal is conducted in the same formation as the formation used to supply methane, disposal is conducted at a location different from the location where methane is supplied in order to minimize the amount of $CO_2$ that may be returned with methane produced and supplied to the process.

Under certain conditions, it may be preferable to dispose of a $CO_2$-containing aqueous stream in the same formation used to supply methane for the GTL process. For example, if the pressure of the formation needs to be maintained, it may be desirable to dispose of a $CO_2$-containing aqueous stream in the same formation used to supply methane. Furthermore, when pressure maintenance and/or augmentation is desired, it may be beneficial for the $CO_2$ to at least partially vaporize. Preferably, $CO_2$ vaporization occurs during injection rather than before or during pumping. $CO_2$ vaporization can be achieved using various suitable processes.

One suitable way to vaporize $CO_2$ is to reduce the pH of the aqueous stream. In addition, while there are many suitable techniques for reducing the pH of an aqueous stream, one suitable technique is to inject acid into the aqueous stream. A convenient source of acid for injection into an aqueous stream is, for example, acid present in waste water produced by a GTL process. Accordingly, in a preferred embodiment, a $CO_2$-containing aqueous stream is injected into a formation to both dispose of the $CO_2$ and to maintain pressure in the formation. Furthermore, an acidic stream may be injected into the formation to reduce the pH of the aqueous stream to facilitate $CO_2$ vaporization. Mixing of the acidic stream and the $CO_2$-containing aqueous stream can be conducted at various locations in the process. However, in order to minimize problems associated with compression, it is preferable to mix the acidic stream and the aqueous stream after they have been separately compressed. Mixing can take place in the formation (either using separate wells or by alternating injection of the streams), or mixing can take place above ground after the liquids have been pressurized.

In addition to reducing pH of the aqueous stream by injecting an acidic stream, one can also lower pH of the aqueous stream by mixing the aqueous stream with a low pH stream. For instance, the pH of an aqueous stream can be reduced by adding at least one low pH stream from a Fischer-Tropsch GTL facility.

Also, the injection of a $CO_2$-enriched aqueous stream into a hydrocarbonaceous formation supplying methane gas may provide benefits other than formation pressure maintenance and/or augmentation. For instance, the aqueous stream may be injected, possibly with an added surfactant, into a hydrocarbonaceous formation to assist in hydrocarbon recovery and/or to displace hydrocarbons to facilitate hydrocarbon production.

If the $CO_2$-containing gas stream contains relatively low amounts of $CO_2$ in comparison to other gases, the aqueous stream may not be highly selective to scrubbing of $CO_2$. In this case, it may be preferable to conduct scrubbing in stages. For instance, a first selective $CO_2$ scrubbing operation may be conducted, followed by desorption to generate a concentrated $CO_2$ gas stream. Finally, scrubbing may be conducted with the aqueous stream. Technology suitable for selective scrubbing of $CO_2$ is well known in the art and typically uses amines. In preferred embodiments, conditions during disposal of the $CO_2$-enriched aqueous phase are set so that a high percentage of the $CO_2$ removed from the $CO_2$-containing gas during scrubbing remains dissolved in the aqueous phase.

Scrubbing of $CO_2$ from gases using aqueous liquids should be performed at non-extreme pressures to avoid formation of methane, $CO_2$ and other hydrates. The dissolution of $CO_2$ and water is favored at high pressures. Thus, it is preferable to operate at as high a pressure as possible, and within economic limits. Accordingly, gas compression is undesirable.

In addition to the importance of monitoring pressure during scrubbing, it may also be important to monitor temperature. For instance, at high temperatures, hydrate formation can occur at elevated pressures. In addition, at lower temperatures, gases may become more soluble in water, resulting in higher selectivity for the removal of $CO_2$ over methane and other valuable hydrocarbons.

In addition to pressure and temperature, salinity can also affect the solubility of hydrocarbons in water. For example, a larger "salting-out" effect can occur when using non-ionic hydrocarbons such as, for example, methane. Accordingly, variations in temperature and salinity of an aqueous solution can be used to maximize selectivity for $CO_2$ removal. In addition, the presence of salt in sea water can create a slight tendency to reduce the temperature at which hydrates will form.

It is well known to those of ordinary skill in the art as disclosed, for example, in E. Dundee Sloan, Jr., *Clathrate Hydrates of Natural Gases*, Marcel Dekker, Inc., 1990, that the maximum pressures that can be tolerated to avoid hydrate formation at various temperatures for methane and $CO_2$ are:

|  | Pure Methane | | Pure Carbon Dioxide | |
| --- | --- | --- | --- | --- |
| Temperature | 2° C. | 8° C. | 0° C. | 10° C. |
| Maximum Pressure, Psia | 2.9 MPa (430 psi) | 6.1 MPa (900 psi) | 1.3 Mpa (192 psi) | 14 Mpa (2000 psi) |
| Equivalent Hydrostatic Water Depth, Feed (62.4 lb/ft₃ water density) | 1,000 ft | 2,100 ft | 450 ft | 4,800 ft |

Sloan also provides numerous examples for gas mixtures and their resulting temperatures and pressures at which hydrates form. Suitable operating pressure/temperature combinations are determined on a case by case basis for each gas composition. Methods for estimating these operating conditions are described in Sloan. For example, for a typical light gas, operating at a pressure of about 300 psig and a temperature of about 10° C. should prevent hydrate formation.

To avoid hydrate formation, pressures less than the maximum pressure should be used. However, hydrate formation can also be controlled by kinetics and heat transfer. Thus, pressures near and/or above this limit can be used as long as the residence time is short.

Henry's Law constants for $CO_2$ and methane in pure water and sea water are:

|  | Methane | | Carbon Dioxide | |
| --- | --- | --- | --- | --- |
| Temperature | 0° C. | 30° C. | 0° C. | 30° C. |
| Henry's Law Constant in Water (atm/mole fraction) | 22,000 | 42,000 | 740 | 1,850 |
| Henry's Law Constant in Sea Water (estimated) | 40,000 | | 740 | |

The above solubility data can be found, for example, in Clifford N. Click, "Applications of Henry's Law to Waste and Process Water VOC Emissions," 85th Annual Meeting Air and Waste Management Association. Click provides Henry's Law coefficients for several light hydrocarbon gases in water as a function of temperature and also provides an equation for the brine effect. In addition, Gianni Astartita, David Savage, and Attilio Bisio, "Gas Treating with Chemical Solvents," Wiley, pp. 208, contains a plot of the Henry's Law coefficient physical solubility of $CO_2$ into water as a function of temperature. Also, John Nighswander, Nicholas Kalogerakis, Anil Mehrotra, "Solubilities of Carbon Dioxide in Water and 1 wt % NaCl Solution at Pressures up to 10 Mpa and Temperatures From 80 to 200 Degrees C.," J. Chem. Eng. Data, 1989, 34, 355–360, discloses that the effect of salt on $CO_2$ solubility in water at temperatures of about 80 to about 200° C. and pressures of up to about 10 MPa is minimal.

The above data demonstrate that using sea water or operating at higher temperatures can enhance the selectivity of $CO_2$ removal. However, under some circumstances, use of sea water for scrubbing is impractical because of the introduction of sea water contaminants into the gas stream. This situation can occur, for example, when sea water is used to scrub $CO_2$ from a Fischer-Tropsch tail gas stream that is recycled to a Fischer-Tropsch or methane reformer reactor. Generally, such contamination should not hinder the use of sea water to scrub a fuel gas stream from a Fischer-Tropsch process derived from a tail gas.

Although the concept of isolating $CO_2$ from the atmosphere by injection into a marine environment, such as an ocean, or into terrestrial formations is not a novel concept, until now, no one has used aqueous streams, preferably at a pressure greater than about atmospheric pressure, to scrub $CO_2$ from a methane-containing gas and then disposed of the resulting $CO_2$-enriched aqueous stream by injection into at least one of a marine environment, a terrestrial formation, a combination thereof or the like. Instead, processes of the prior art merely disclose handling relatively pure $CO_2$ by processing gas through expensive gas compressors, liquefaction facilities or solidification facilities.

For example, U.S. Pat. No. 6,190,301, to Murray discloses a process and vehicle for disposal of $CO_2$. In Murray, gaseous $CO_2$ is first solidified and then allowed to free fall in a marine environment through open water where it at least partially embeds itself in sedimentary formations. Sedimentation ensures that the marine environment serves as a carbon sink through carbonate sequestration. Thus, Murray describes converting gaseous $CO_2$ into a solid, requiring the use of expensive refrigeration and compression processes. Murray does not disclose dissolution of $CO_2$ using an aqueous phase, preferably at an elevated pressure, and disposal of a resulting $CO_2$-enriched aqueous stream in at least one of a marine environment, a terrestrial formation or combination thereof.

Similarly, U.S. Pat. No. 6,170,264 to Viteri discloses a low or no pollution engine for delivering power for vehicles or other power applications. Fuel and oxygen are combusted in a gas generator forming water and $CO_2$ with carbon-containing fuels. Combustion products, steam, carbon-containing fuels and $CO_2$ are passed through a condenser wherein the steam is condensed and the $CO_2$ is collected or discharged. The $CO_2$ is then compressed and cooled so that it is in a liquid or super critical state. The dense phase $CO_2$ is then further pressurized to a pressure matching a pressure, less hydrostatic head, existing deep within a porous geological formation, a deep aquifer, a deep ocean location or other terrestrial formation from which the return of $CO_2$ to the atmosphere is inhibited. Accordingly, Viteri discloses disposing of $CO_2$ from a power generation plant into the ocean or a terrestrial formation by first compressing and cooling $CO_2$ gas to form a liquid phase and then further compressing the liquid to match the hydrostatic head. Viteri does not describe isolating $CO_2$ from a methane-containing gas and then disposing of a resulting $CO_2$-enriched aqueous stream in at least one of a marine environment, a terrestrial formation or combinations thereof.

United Kingdom Patent Application GB 2123027 to Mituyuki and Shinkichi describes the use of aqueous adsorbents to scrub $CO_2$ from synthesis gas streams (including those from a Fischer Tropsch unit) for the purpose of increasing the carbon oxide content of the syngas streams.

In contrast, the process of the present invention removes $CO_2$ from a $CO_2$-containing gas using an aqueous stream and disposes of the resulting $CO_2$-enriched aqueous stream without employing costly compression, liquefaction or solidification processes. Moreover, in the present invention, even if compression of the aqueous stream is desired, compression can be accomplished using relatively inexpensive liquid phase pumps.

Figure 2:
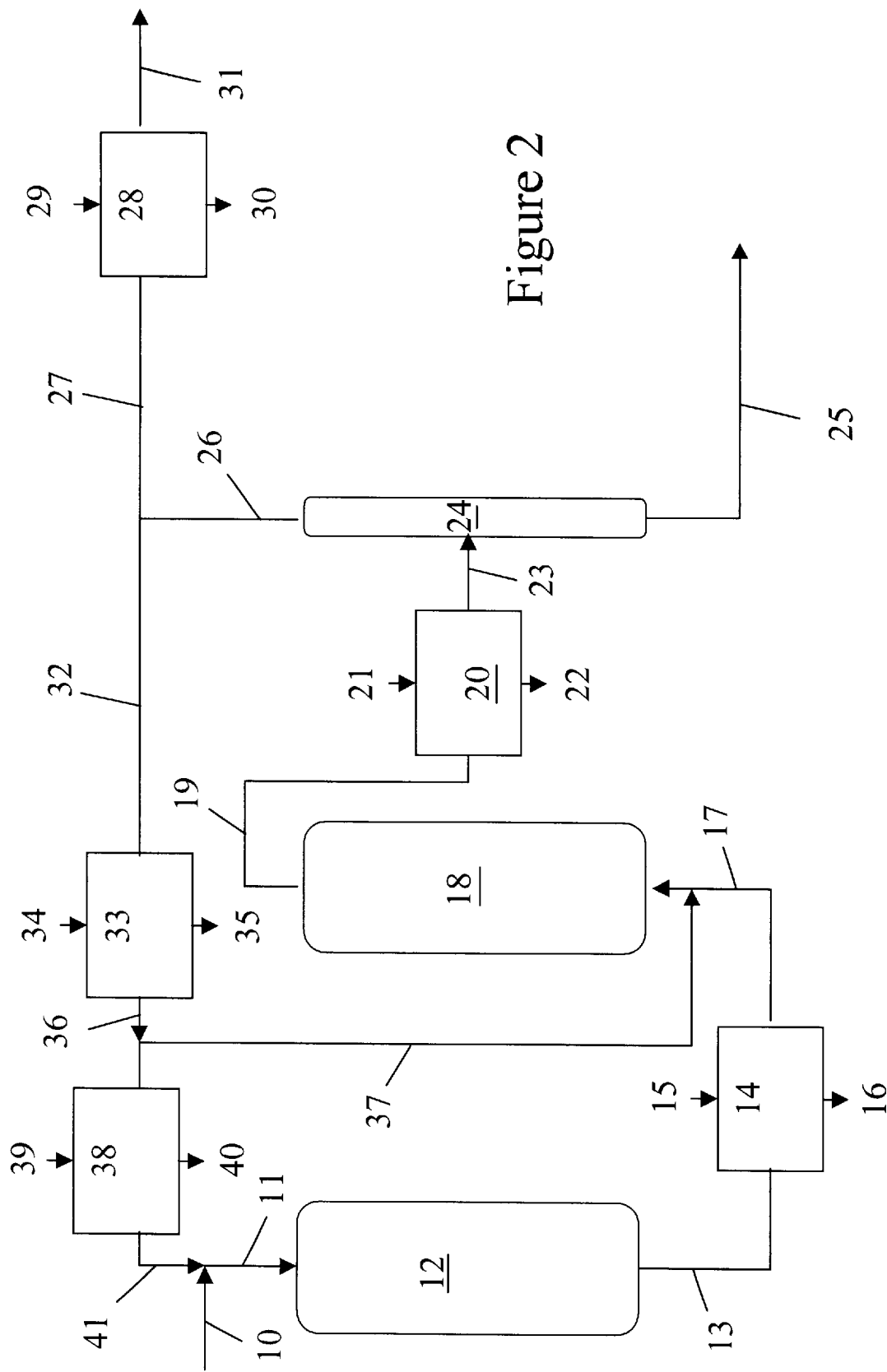
FIG. 2 is a schematic view of a preferred embodiment of a Fischer-Tropsch process according to the present invention.

A preferred embodiment of the present invention is depicted in FIG. 2. In this preferred embodiment, scrubbers are shown at five possible locations in the process scheme. Scrubbers at one or more of the indicated locations in various combinations may be used, but the most preferred locations are number 14 and number 334. In this embodiment, a feed stream 10, comprising $CH_4$, $O_2$ and $H_2O$, enters the process. The feed stream 10 enters a synthesis gas formation reactor 12 wherein a synthesis gas stream 13 is generated. The synthesis gas may contain some methane which will not react in the downstream Fischer-Tropsch process and will increase in concentration over time. The synthesis gas stream 13 exits the synthesis gas formation reactor 12 and enters a first aqueous scrubber 14. A water stream 15 enters the first aqueous scrubber 14 and an aqueous exit stream 16 exits the first aqueous scrubber 14, wherein the aqueous exit stream comprises $H_2O$ and $CO_2$. A scrubbed synthesis gas stream 17 also exits the first aqueous scrubber 14 and enters a Fischer-Tropsch reactor 18. A Fischer-Tropsch process is conducted and at least a portion of a Fischer-Tropsch vapor product stream 19 exists the Fischer-Tropsch reactor 18 and enters a second aqueous scrubber 20. A water stream 21 enters the second aqueous scrubber 20 producing an aqueous stream 22, comprising $H_2O$ and $CO_2$, that exits the aqueous scrubber 20. A scrubbed Fischer-Tropsch product stream 23 exits the second aqueous scrubber 20 and enters a separator 24. Heavy products which do not contain appreciable amounts of $CO_2$ may be routed directly from reactor 18 to the separation vessel 24 (line not shown). The separator 24 separates the scrubbed Fischer-Tropsch product stream 23 producing a hydrocarbon products stream 25,including $C_5^+$ liquids, and an unreacted gas stream 26, comprising unreacted CO, $H_2$, $CO_2$ and some methane. The unreacted gas stream 26 can be separated into an excess unreacted gas stream 27 that is to be disposed of by being incinerated with a flare (not shown). Before incineration, the excess unreacted gas stream 27, comprising CO, $H_2$, $CO_2$ and $CO_4$, enters a third aqueous scrubber 28. A water stream 29 enters the third aqueous scrubber 28 and an exit aqueous stream 30 exits the aqueous scrubber 28 comprising $H_2O$ and $CO_2$. Then a scrubbed excess unreacted gas stream 31 exits the third aqueous scrubber 28 to be incinerated in a flare (not shown). In addition to generating an excess unreacted gas stream 27, the unreacted gas stream 26, separated from the scrubbed Fischer-Tropsch product stream 23 by the separator 24, can also produce a recirculated unreacted gas stream 32. The recirculated unreacted gas stream 32 enters a fourth aqueous scrubber 33. A water stream 34 enters the fourth aqueous scrubber 33 generating an aqueous stream 35, comprising $H_2O$ and $CO_2$. A scrubbed recirculated unreacted gas stream 36 exits the fourth aqueous scrubber 33. The scrubbed recirculated unreacted gas stream 36 exits the fourth aqueous scrubber 33 and either enters a fifth aqueous scrubber 38 or is recirculated in a scrubbed recirculated unreacted gas stream 37 that mixes with the scrubbed synthesis gas stream 17 before entering the Fischer-Tropsch reactor 18. Upon entering the fifth aqueous scrubber 38, a water stream 39 enters the fifth aqueous scrubber 38 and generates an aqueous stream 40, comprising $H_2O$ and $CO_2$. Finally, a scrubbed unreacted gas stream 41 exits the fifth scrubber 38 and mixes with the feed gas stream 10 producing a mixed feed stream 11 entering the synthesis gas formation reactor 12. Although not shown in FIG. 2, each of the aqueous streams, 16, 22, 30, 35 and 40, exiting the aqueous scrubbers, 14, 20, 28, 33 and 38, are disposed of by being injected into at least one of a body of water, a terrestrial formation, a combination thereof or the like.

EXAMPLES

Example 1

A tail gas from a Fischer-Tropsch process, using a non-shifting catalyst, is obtained at a pressure of about 300 psig and has the following composition on a water-free basis:

| | |
|---|---|
| Methane | 13% |
| Carbon Dioxide | 35% |
| Carbon Monoxide | 25% |
| Hydrogen | 25% |
| Inerts (Nitrogen) | 2% |

Henry's Law constants, $K_H$, are provided, for example, in Arthur Kohn, Richard Nielsen, "Gas Purification," Gulf Publishing Company, 1997, pp. 417–465.

The above gas is used in two operations: recycle to the Fischer-Tropsch facility and a fuel gas. The recycle stream is scrubbed with de-aerated water to avoid introduction of contaminants into the Fischer-Tropsch facility. The fuel gas is scrubbed with de-aerated sea water. Both scrubbing operations are conducted at about 20° C. The tail gas is scrubbed to remove about 50% of the $CO_2$ and the fuel gases are scrubbed to remove about 75% of the $CO_2$. Scrubbing is performed using a counter-current process.

| Treated Gas Stream | Tail gas | Fuel Gas |
|---|---|---|
| Temperature, ° C. | 20 | 20 |
| Water required, gal/SCF gas (equilibrium limit) | 35.7 moles $H_2O$ per mole gas feed (0.19 gal/SCF) | 53.6 0.28 |
| Water required, gal/SCF gas (practical) | 42.8 moles $H_2O$ per mole gas feed 0.23 gal/SCF | 64.3 0.34 |
| | Moles/mole feed (%) | Moles/mole feed (%) |
| Scrubbed Gas Composition | | |
| Carbon Dioxide | 17.5 (21.4) | 8.75 (12.1) |
| Carbon Monoxide | 24.65 (30.2) | 24.45 (33.8) |
| Methane | 12.74 (15.6) | 12.6 (17.4) |
| Hydrogen | 24.72 (30.3) | 24.57 (34) |
| Nitrogen/inerts | 1.98 (2.4) | 1.97 (2.7) |
| Percent Removal | | |
| Carbon Dioxide | 50 | 75 |
| Carbon Monoxide | 1 | 1 |
| Methane | 2 | 3 |
| Hydrogen | 1 | 1 |
| Nitrogen/inerts | 1 | 1 |

Use of non-de-aerated water and sea water would necessitate a nominal increase in water supply of about 10%. Thus de-aeration is desirable, but not essential.

The above data demonstrate that scrubbing a Fischer-Tropsch tail gas using water for recycle to a Fischer-Tropsch facility or synthesis gas generator effectively removes $CO_2$ as well as a minimal amount of methane. Furthermore, while effective in removing $CO_2$, the above process only removes minor amounts of valuable CO or $H_2$. Likewise, sea water scrubbing of the fuel gas is an effective means for removing $CO_2$.

While the present invention has been described with reference to specific embodiments, this application is intended to cover those various changes and substitutions that may be made of those of ordinary skill in the art without departing from the spirit and scope of the appended claims.

What is claimed is:

1. A process for removing $CO_2$ from a $CO_2$-containing gas, the process comprising:
   a) scrubbing $CO_2$ from a $CO_2$-containing gas using an aqueous phase liquid, forming a $CO_2$-enriched aqueous phase, wherein the aqueous phase liquid is at a pressure greater than about atmospheric pressure and wherein the aqueous phase liquid has a pH of at least about 7.0 before scrubbing; and
   b) disposing of the $CO_2$-enriched aqueous phase in at least one of a marine environment, a terrestrial formation or combination thereof, wherein disposal of the $CO_2$-enriched aqueous phase is done at a temperature, pressure, and pH sufficient to ensure that about 75% or more of the $CO_2$ removed from the $CO_2$-containing gas remains dissolved in the aqueous phase.

2. The process of claim 1, wherein the $CO_2$-containing gas is present in a Fischer-Tropsch GTL process stream.

3. The process of claim 1, wherein about 90% or more of the $CO_2$ removed from the $CO_2$-containing gas remains dissolved in the aqueous phase.

4. The process of claim 1, wherein said aqueous phase liquid is selected from the group consisting of sea water, reaction water generated during a Fischer-Tropsch process, spent cooling water from a Fischer-Tropsch process, river water, non-potable water sources, water recovered from crude or gas production, and combinations thereof.

5. The process of claim 1, wherein the terrestrial formation is selected from the group consisting of a hydrocarbonaceous formation, that is the same as or different from a source providing the methane-containing gas, a non-hydro carbonaceous formation or combination thereof.

6. The process of claim 1, wherein the $CO_2$-containing gas is an exhaust gas from a furnace.

7. A process for converting methane-containing gas in a Fischer-Tropsch GTL process into liquid hydrocarbons, the process comprising:
   a) converting methane-containing gas into synthesis gas;
   b) converting at least a portion of the synthesis gas into liquid hydrocarbons and $CO_2$-containing gas;
   c) scrubbing $CO_2$ from the $CO_2$-containing gas using an aqueous phase liquid, forming a $CO_2$-enriched aqueous phase wherein during scrubbing the aqueous phase liquid is at a pressure greater than about atmospheric pressure and wherein the aqueous phase liquid has a pH of at least 7.0 before scrubbing; and
   d) disposing of the $CO_2$-enriched aqueous phase in at least one of a marine environment, a terrestrial formation or combination thereof wherein disposal of the $CO_2$-enriched aqueous phase is done at a temperature, pressure and pH sufficient to ensure that about 75% or more of the $CO_2$ removed from the $CO_2$-containing gas remains dissolved in the aqueous phase.

8. The process of claim 7, wherein about 90% or more of the $CO_2$ removed from the $CO_2$-containing gas remains dissolved in the aqueous phase.

9. The process of claim 7, wherein the aqueous phase liquid is selected from the group consisting of sea water, reaction water generated during a Fischer-Tropsch process, spent cooling water from a Fischer-Tropsch process, river water, non-potable water sources, water recovered from crude or gas production and combinations thereof.

10. The process of claim 7, wherein a pH of the aqueous phase liquid is adjusted to at least about 7.0 before scrubbing using a process selected from the group consisting essentially of oxidation, distillation, neutralization, extraction, ion exchange and combinations thereof.

11. The process of claim 7, wherein scrubbing with the aqueous phase liquid is conducted by contacting the $CO_2$-containing gas with a $CO_2$-selective adsorbent, treating the $CO_2$-selective adsorbent to form a $CO_2$-enriched gas stream and thereafter contacting the $CO_2$-enriched gas stream with the aqueous phase liquid.

12. The process of claim 7, wherein the terrestrial formation is selected from the group consisting essentially of a hydrocarbonaceous formation, that is the same as or different from a source providing the methane-containing gas, a non-hydrocarbonaceous formation and combinations thereof.

13. A process for removing $CO_2$ from a $CO_2$-containing gas, the process comprising:
   a) scrubbing $CO_2$ from a $CO_2$-containing gas, present in a Fischer-Tropsch GTL process stream and/or a furnace exhaust gas, using an aqueous phase liquid at a pressure greater than about atmospheric pressure wherein the aqueous phase liquid has a pH of at least about 7.0 before scrubbing; and
   b) disposing of the $CO_2$-enriched aqueous phase in at least one marine environment, a terrestrial formation, or combination thereof at a temperature, pressure and pH sufficient to ensure that at least about 75% of the $CO_2$ removed from the $CO_2$-containing gas remains in the aqueous phase.

14. A process for converting methane-containing gas generated form a Fischer-Tropsch GTL process into liquid hydrocarbons, the process comprising:
   a) converting methane-containing gas into synthesis gas;
   b) converting at least a portion of the methane-containing gas into liquid hydrocarbons and by-product $CO_2$-containing gas by a Fischer-Tropsch process;
   c) scrubbing $CO_2$ from the $CO_2$-containing gas using an aqueous phase liquid at a pressure greater about atmospheric pressure, forming a $CO_2$-enriched aqueous phase wherein the aqueous phase liquid comprises water selected from the group consisting of reaction water generated during the FischerTropsch process, spent cooling water from the Fischer-Tropsch process, and mixtures thereof; and
   d) disposing of the $CO_2$-enriched aqueous phase in at least one of a marine environment, a terrestrial formation or combination thereof at a temperature, pressure and pH sufficient to ensure that at least about 75% of the $CO_2$ removed from the $CO_2$-containing gas remains dissolved in the aqueous phase.

15. The process of claim 14, further comprising isolating at least a portion of the reaction water generated during the Fischer-Tropsch process, the spent cooling water from the Fischer-Tropsch process or mixtures thereof to provide an aqueous phase liquid to scrub $CO_2$ from the $CO_2$-containing gas.

16. The process of claim 14, wherein prior to contact with the by-product $CO_2$-containing gas, the aqueous phase liquid has a pH of at least about 7.0.

17. The process of claim 16, further comprising adjusting the pH of the aqueous phase liquid by adding an alkali material, adding ammonia, adding a base, or combinations thereof.

18. The process of claim 1, further comprising adjusting the pH of the aqueous phase liquid with a basic material prior to scrubbing $CO_2$ from the $CO_2$-containing gas.

19. The process of claim 18, wherein the pH is adjusted by adding an alkali material, adding ammonia, adding a base, or combinations thereof.

20. The process of claim 1, further comprising de-aerating the aqueous phase liquid prior to scrubbing $CO_2$ from the $CO_2$-containing gas.

* * * * *

UNITED STATES PATENT AND TRADEMARK OFFICE
CERTIFICATE OF CORRECTION

PATENT NO. : 6,720,359 B2
DATED : April 13, 2004
INVENTOR(S) : Dennis J. O'Rear et al.

It is certified that error appears in the above-identified patent and that said Letters Patent is hereby corrected as shown below:

Column 12,
Line 45, please insert -- s -- after the word "combination".

Column 13,
Line 20, please insert -- s -- after the word "combination".
Line 24, please delete the word "form" and insert the word -- from -- in place thereof.
Line 32, between the words "greater" and "about", please insert the word -- than --.

Column 14,
Line 7, please insert -- s -- after the word "combination".

Signed and Sealed this

Twenty-seventh Day of July, 2004

JON W. DUDAS
*Acting Director of the United States Patent and Trademark Office*